2 Sheets—Sheet 1.

J. R. HOPKINS.
ESCAPEMENTS FOR WATCHES.

No. 179,019. Patented June 20, 1876.

WITNESSES:
Jas. E. Hutchinson
John R. Young

INVENTOR:
J. R. Hopkins, by
Prindle and Co, his attys

2 Sheets—Sheet 2.

J. R. HOPKINS.
ESCAPEMENTS FOR WATCHES.

No. 179,019. Patented June 20, 1876.

WITNESSES:
Jas. E. Hutchinson
John R. Young

INVENTOR.
J. R. Hopkins, by
Prindle and Cox his attys

UNITED STATES PATENT OFFICE.

JASON R. HOPKINS, OF WASHINGTON, DISTRICT OF COLUMBIA, ASSIGNOR TO WILLIAM B. FOWLE, OF AUBURNDALE, MASSACHUSETTS.

IMPROVEMENT IN ESCAPEMENTS FOR WATCHES.

Specification forming part of Letters Patent No. 179,019, dated June 20, 1876; application filed May 25, 1876.

*To all whom it may concern:*

Be it known that I, JASON R. HOPKINS, of Washington, in the county of Washington, and in the District of Columbia, have invented certain new and useful Improvements in Watches; and do hereby declare that the following is a full, clear, and exact description thereof, reference being had to the accompanying drawings, making a part of this specification, in which—

Figure 1:
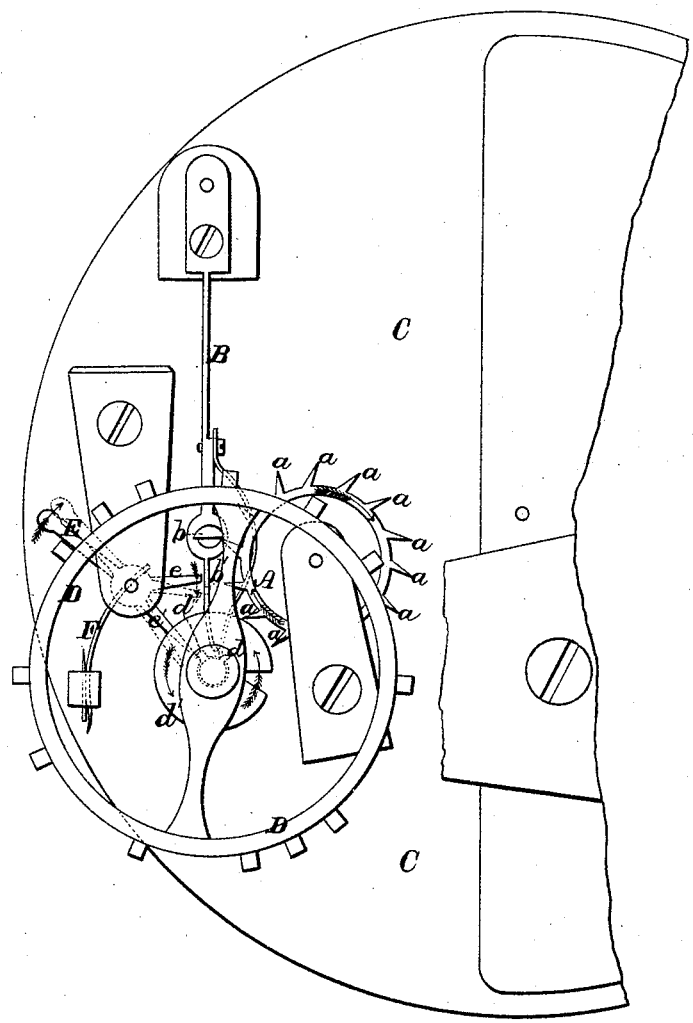
Figure 2:
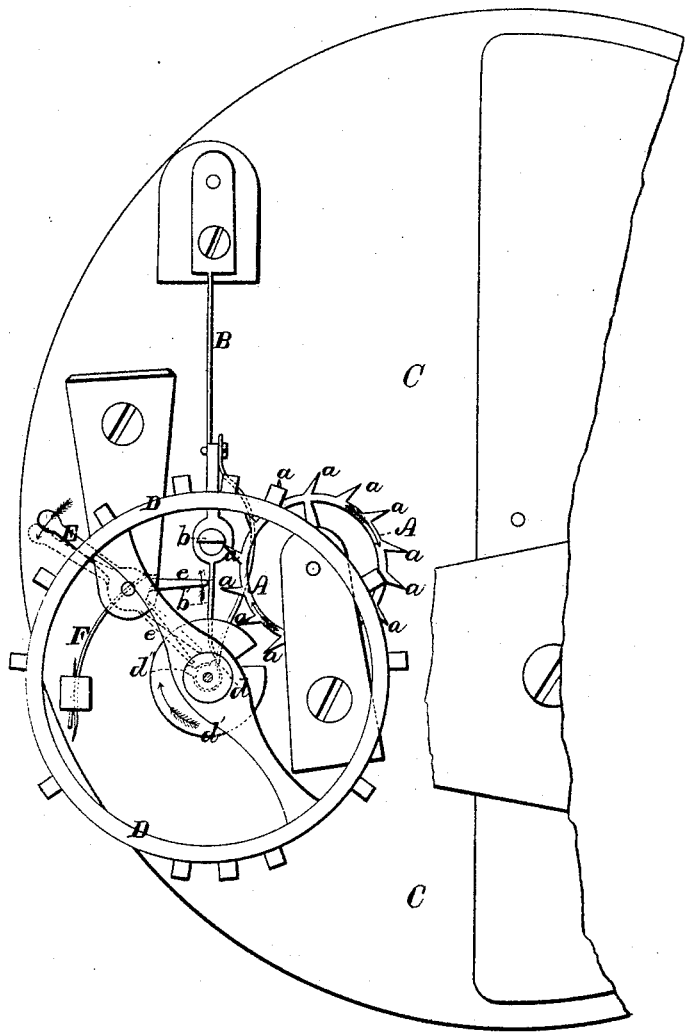

Figure 1 is a plan view of my improved mechanism in position upon a watch-movement, the detent being locked in position, and the balance-wheel moving in the direction to unlock and raise said detent; and Fig. 2 is a like view of said parts, said balance-wheel having an opposite or return motion with the locking-bar, and said detent in position to be tripped.

Letters of like name and kind refer to like parts in each of the figures.

In the use of chronometer-escapements in watches and in portable clocks, it is not unusual for the spring-detent which controls the movement of the escape-wheel to be thrown out of engagement with the latter by a jar or sudden movement, by which means said escape-wheel is permitted to revolve and the train to run down, the effect being to break or injure the escape-wheel or detent, and to render the mechanism unreliable for time-keeping purposes. To obviate these difficulties is the design of my invention, which consists in combining with the detent which regulates the movement of the escape-wheel of a chronometer-escapement, a locking-bar which engages with and locks in position said detent, except when the latter is about to be raised by the vibration of the balance-wheel, and at such time is released from such engagement, in the manner and for the purpose substantially as is hereinafter specified.

In the annexed drawings, A represents an escape-wheel, provided with peripheral teeth a, a, and a. B is a spring-bar, that is secured at one end to or upon the plate C of the watch, is provided near its outer end with a detent, b, and is arranged so as to cause the latter to engage with one of said teeth a, and arrest the movement of said wheel, and D is a balance-wheel that is journaled near said escape-wheel and the outer end of said bar, and is provided with a radial spur, d, which engages with and raises the end of said lever, when moving in one direction, so as to permit t:e passage of a tooth by said detent, the whole forming a chronometer-escapement of usual construction. Pivoted near its longitudinal center upon the plate C, upon the outer or rear side of the detent-bar B, is a bar, E, which has at one side of its pivotal bearing two diverging arms, e and e', and by means of a suitable spring, F, is held in such position as to cause the end of one of said arms e to be brought into close proximity to the rear side of said detent-bar in front of the detent b, while the second arm e' extends in a direct line toward the radial center of the balance-wheel D, and terminates near the collet d', from which projects the tripping-spur d. A second spur, d'', extends radially outward from the collet d', and, engaging with the end of the arm e', moves said arm, and vibrates the bar E in each direction whenever the balance-wheel D makes a double vibration, said spur d'' being arranged with relation to the spur d as to cause said locking-bar to be moved just before the detent-bar is raised by said spur d to permit the movement of the escape-wheel.

When the bar E occupies its normal position, the arm e locks the detent-bar B in place and prevents the latter from being raised, so as to permit motion of the escape-wheel, and in order that such motion may be effected at the proper time, a slot or opening, b', (shown by dotted lines,) which corresponds in shape to, but is slightly larger than the end of said arm e, is provided in and through said detent-bar B at a point just in advance of the position occupied by said arm end when at rest, and in line with the same when the said locking-bar is moved by the forward motion of the balance-wheel.

As thus arranged, the locking-bar E prevents motion of the detent-bar B until the former has been moved to the position shown by the dotted lines of Fig. 1, immediately after which change of position the spur d raises said detent-bar, the escape-wheel moves forward one tooth, said detent-bar drops into engagement with the next tooth, and is locked in place once more by said locking-bar, which then assumes its normal position.

Upon the backward motion of the balance-wheel the spur $d''$ moves the arm $e'$ sufficiently to one side, as seen by dotted lines of Fig. 2, to permit its passage, after which said arm is returned to place by the spring F.

If desired, the spring F may be omitted, and that portion of the locking-bar E outside its pivotal bearing may be constructed of a flat spring.

Having thus fully set forth the nature and merits of my invention, what I claim as new is—

In combination with the detent-bar B, provided with the opening or slot $b'$, the pivoted locking-bar E, having the arms $e$ and $e'$, and arranged so that said arm $e$ shall engage with said detent-bar, and said arm $e'$ shall engage with and be tripped by a spur, $d''$, upon the collet $d'$ of the balance-wheel, substantially as and for the purpose specified.

In testimony that I claim the foregoing I have hereunto set my hand this 4th day of April, 1876.

JASON R. HOPKINS.

Witnesses:
 GEO. S. PRINDLE,
 WILLIAM FITCH.